United States Patent
Miura et al.

(10) Patent No.: US 11,073,833 B2
(45) Date of Patent: Jul. 27, 2021

(54) VEHICLE CONTROL APPARATUS

(71) Applicant: HONDA MOTOR CO., LTD., Tokyo (JP)

(72) Inventors: Hiroshi Miura, Wako (JP); Marina Saikyo, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 233 days.

(21) Appl. No.: 16/365,246

(22) Filed: Mar. 26, 2019

(65) Prior Publication Data
US 2019/0302789 A1 Oct. 3, 2019

(30) Foreign Application Priority Data
Mar. 28, 2018 (JP) .............................. JP2018-061448

(51) Int. Cl.
*G05D 1/02* (2020.01)
*G06K 9/00* (2006.01)
*G06K 9/20* (2006.01)
*G08G 1/095* (2006.01)

(52) U.S. Cl.
CPC ....... *G05D 1/0231* (2013.01); *G06K 9/00825* (2013.01); *G06K 9/2054* (2013.01); *G05D 1/0257* (2013.01); *G08G 1/095* (2013.01)

(58) Field of Classification Search
CPC ............ G06K 9/00825; G05D 1/0088; B60W 30/18154; G01C 21/3602
See application file for complete search history.

(56) References Cited

U.S. PATENT DOCUMENTS

2012/0140072 A1* 6/2012 Murashita .......... G06K 9/00805
348/148
2013/0253754 A1* 9/2013 Ferguson ............. G05D 1/0231
701/28

FOREIGN PATENT DOCUMENTS

JP 2013-149053 A 8/2013
KR 102163317 B1 * 9/2016 ............ B60W 10/24

* cited by examiner

*Primary Examiner* — Kenneth J Malkowski

(74) *Attorney, Agent, or Firm* — Carrier Blackman & Associates, P.C.; Joseph P. Carrier; William D. Blackman

(57) ABSTRACT

A vehicle control apparatus is configured to have a first state for performing travel control of a host vehicle based on traffic signals that appear in images captured by front cameras and a second state for performing travel control of the host vehicle based on traffic signals that appear in images captured by a front left camera, a front right camera, a rear left camera, or a rear right camera. The vehicle control apparatus is capable of performing travel control of the host vehicle in the first state when the host vehicle progresses straight, and transitioning from the first state to the second state while the host vehicle is turning left or right (during the turning operation).

4 Claims, 12 Drawing Sheets

VEHICLE CONTROL APPARATUS

CROSS-REFERENCE TO RELATED APPLICATION

This application is based upon and claims the benefit of priority from Japanese Patent Application No. 2018-061448 filed on Mar. 28, 2018, the contents of which are incorporated herein by reference.

BACKGROUND OF THE INVENTION

Field of the Invention

The present invention relates to a vehicle control apparatus that automatically performs, at least partially, travel control of a host vehicle, based on images captured by a plurality of cameras provided to a host vehicle.

Description of the Related Art

A conventional vehicle control apparatus is known that automatically performs, at least partially, travel control of a host vehicle. For example, various types of driving support enabling a host vehicle to travel smoothly near an intersection are being developed.

Japanese Laid-Open Patent Publication No. 2013-149053 describes, when it is judged that a right turn cannot be completed in a case where a vehicle attempts to make a right turn at an intersection after the green light for a right turn has ended, notifying the vehicle to stop the right turn.

SUMMARY OF THE INVENTION

When automatically performing travel control of the host vehicle, the vehicle control apparatus performs the travel control based on information (traffic signal information) of a traffic signal that appears in images captured by a plurality of cameras provided to the host vehicle. However, when the same camera continues to capture images of the traffic signal while the host vehicle turns left or right at an intersection, for example, there is a possibility that the traffic signal (information) will be partly or entirely left out of the captured images. As a result, it is difficult to automatically perform the travel control during a left or right turn at an intersection. Japanese Laid-Open Patent Publication No. 2013-149053 makes no mention of how to make the host vehicle travel smoothly in such a case.

The present invention aims to solve the above problem, and it is an objective of the present invention to provide a vehicle control apparatus that is capable of continuing to capture images of a traffic signal relating to the travel control when performing travel control of a host vehicle.

The vehicle control apparatus of the present invention is a vehicle control apparatus that automatically performs, at least partially, travel control of a host vehicle, based on images captured by a plurality of cameras provided to the host vehicle, wherein the plurality of cameras are formed from a first camera that captures an image of at least a front region in front of the host vehicle and a second camera that captures an image of at least a side region adjacent to the front region, the vehicle control apparatus is configured to have a first state for performing the travel control based on traffic signal information of the image captured by the first camera and a second state for performing the travel control based on traffic signal information of the image captured by the second camera, and the vehicle control apparatus is capable of performing the travel control in the first state when the host vehicle progresses straight, and transitioning from the first state to the second state while the host vehicle performs a turning operation.

In this way, by transitioning from the first state to the second state while the host vehicle is performing the turning operation, it is possible to continue capturing images of a traffic signal. Therefore, even when the host vehicle performs the turning operation, it is possible to perform the travel control, including at least acceleration and deceleration control of the host vehicle, based on the traffic signal information of the images captured over a long period of time.

Furthermore, since the first state is maintained when the host vehicle is progressing straight (when the host vehicle does not perform the turning operation), it is possible to reduce the causes of erroneous detection (for example, cases where there afternoon sun is in the side region captured by the second camera) of the traffic signals such as the display colors of the traffic signals between first camera and the second camera due to unexpected transitioning from the first state to the second state.

In this case, the vehicle control apparatus may transition from the first state to the second state upon having determined that the traffic signal information in the images captured by the first camera and the second camera are the same traffic signal information, based on the signal period, display color, display pattern, installation position, or surrounding environment of the traffic signal indicated by the traffic signal information. Therefore, it is possible to reliably continue capturing the same traffic signal information.

The vehicle control apparatus is capable of transitioning from the first state to the second state when the host vehicle turns left or right at an intersection. Therefore, the first state is maintained when the host vehicle progresses straight through the intersection. As a result, it is possible to perform suitable travel control according to the travel operation of the host vehicle.

The vehicle control apparatus is capable of transitioning from one state to the other state when the same traffic signal information appears in the images captured by the first camera and the second camera, whose imaging regions partially overlap. In this way, it is possible to avoid situations where the traffic signal information is partly or entirely left out of the images.

The vehicle control apparatus is capable of, while the host vehicle performs the turning operation, at least transitioning from the first state to the second state for performing the travel control based on the traffic signal information of the image captured by the second camera arranged on an outer side of the host vehicle relative to the turning direction of the host vehicle. Therefore, it is possible to continue capturing images without leaving out the traffic signal information.

In a case where a plurality of traffic signals are installed in order along the turning direction, the vehicle control apparatus may transition from the first state to the second state while the host vehicle performs the turning operation, and thereafter transitions from the second state to the first state. Therefore, it is possible to smoothly perform the travel control while sequentially capturing images of the plurality of traffic signals.

In a case where a plurality of traffic signals are installed, the vehicle control apparatus may transition from the first state to the second state while the host vehicle performs the turning operation, thereby prioritizing image capturing of the traffic signals located in the turning direction of the host vehicle with the second camera. Therefore, it is possible to efficiently and smoothly perform the travel control and the image capturing of the traffic signal.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

The following describes examples of preferred embodiments of the vehicle control apparatus according to the present invention, while the accompanying drawings are referred to.

[1. Configuration of the Vehicle Control Apparatus 10]

<1.1. Overall Configuration>

Figure 1:
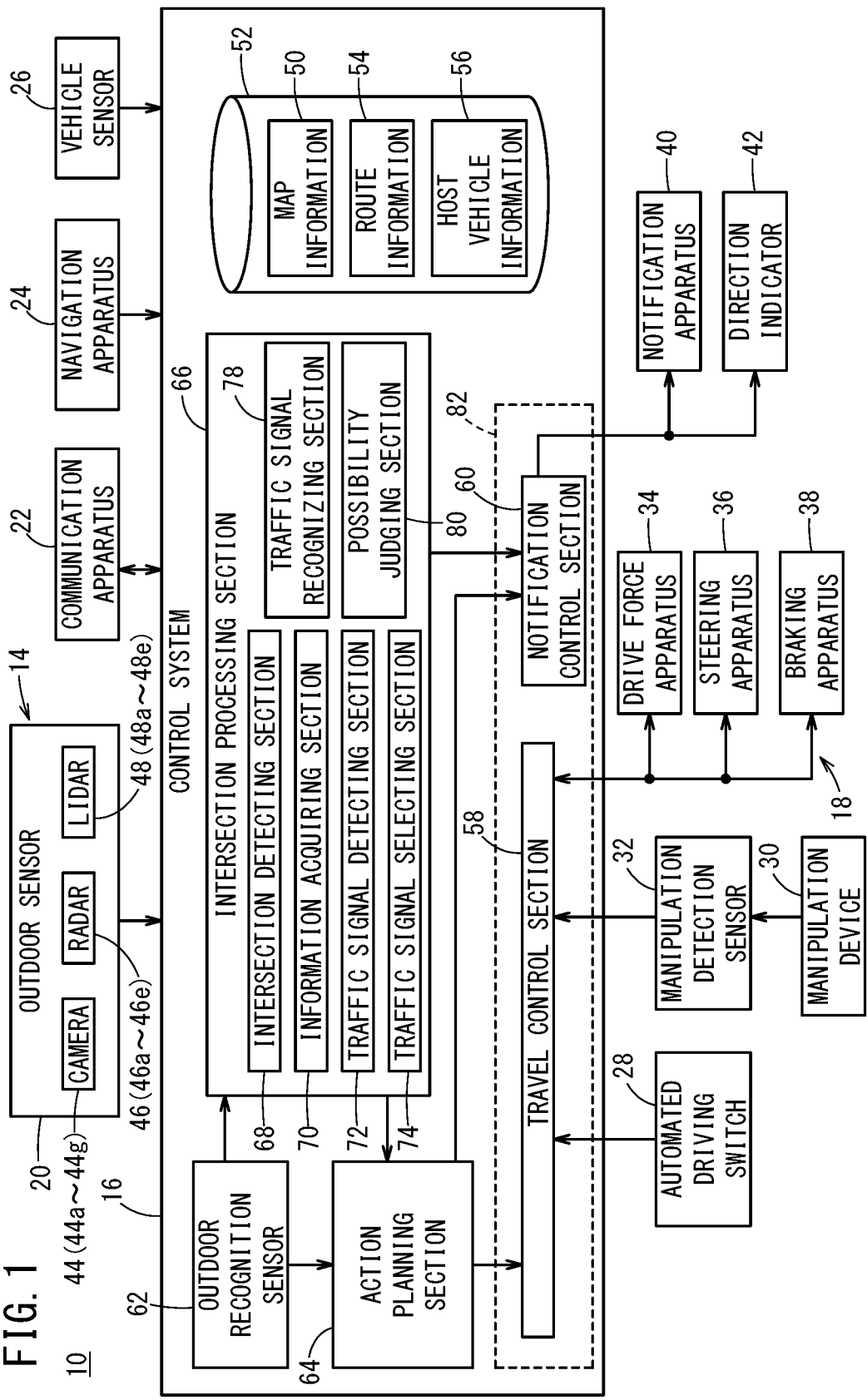
FIG. 1 is a block diagram showing the configuration of a vehicle control apparatus according to an embodiment of the present invention.
Figure 2:
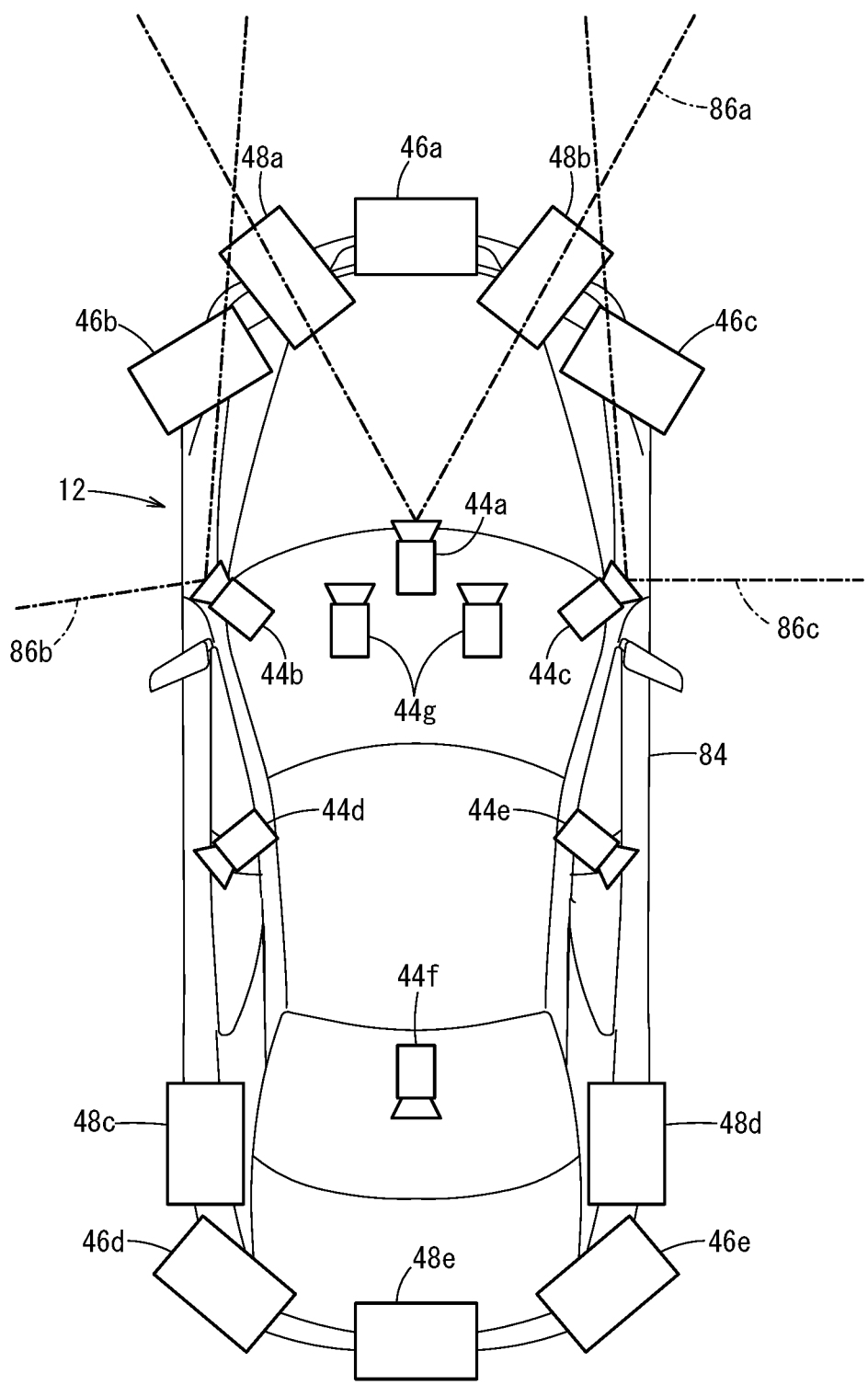
FIG. 2 is a descriptive diagram schematically showing an arrangement of the outdoor sensors on the host vehicle.

FIG. 1 is a block diagram showing the configuration of a vehicle control apparatus 10 according to an embodiment of the present invention. The vehicle control apparatus 10 is incorporated in a vehicle 12 (also referred to below as a host vehicle 12) that is shown in FIG. 2, and performs travel control of the host vehicle 12 automatically or manually. Here, "automated driving" is a concept that includes not only "completely automated driving" where all of the travel control of the host vehicle 12 is performed automatically, but also includes "partially automated driving" where part of the travel control is performed automatically. Furthermore, "travel control" refers to control relating to the travelling of the host vehicle 12, including at least acceleration and deceleration control of the host vehicle 12. In the description below, an example is described of a case where the host vehicle 12 is travelling on a road in a geographical region (e.g. the U.S.) where it is decided that vehicles travel on the right side of the road.

The vehicle control apparatus 10 shown in FIG. 1 is basically formed by an input system apparatus group 14, a control system 16, and an output system apparatus group 18.

Each of the apparatuses forming the input system apparatus group 14 and the output system apparatus group 18 is connected to the control system 16 through communication lines.

The input system apparatus group 14 includes an outdoor sensor 20, a communication apparatus 22, a navigation apparatus 24, a vehicle sensor 26, an automated driving switch 28, and a manipulation detection sensor 32 that is connected to a manipulation device 30.

The output system apparatus group 18 includes a drive force apparatus 34 that drives wheels (not shown in the drawing), a steering apparatus 36 that steers these wheels, a braking apparatus 38 that brakes these wheels, a notification apparatus 40 that notifies a driver visually or audibly, and a direction indicator 42 that provides notification to the outside about the direction of a left or right turn by the host vehicle 12.

<1.2. Specific Configuration of the Input System Apparatus Group 14>

The outdoor sensor 20 acquires information (referred to below as outdoor information) indicating the state outside the host vehicle 12, and outputs this outdoor information to the control system 16. Specifically, the outdoor sensor 20 is configured to include a plurality of cameras 44, a plurality of radars 46, and a plurality of LIDARs 48 (Light Detection and Ranging/Laser Imaging Detection and Ranging).

The communication apparatus 22 is configured to be able to communicate with external apparatuses including streetside devices, other vehicles, and servers, and transmits and receives information concerning traffic equipment, information concerning another vehicle, probe information, or latest map information 50. This map information 50 is stored in a prescribed memory region of a storage apparatus 52 provided to the control system 16 or in the navigation apparatus 24.

The navigation apparatus 24 is formed to include a satellite positioning apparatus, capable of detecting the current position of the host vehicle 12, and a user interface (e.g. a touch panel display, speaker, and microphone). The navigation apparatus 24 calculates a route to a designated destination based on the current position of the host vehicle 12 or a position designated by the user, and outputs this route to the control system 16. The route calculated by the navigation apparatus 24 is stored as route information 54 in a prescribed memory region of the storage apparatus 52.

The vehicle sensor 26 includes a velocity sensor that detects the travel velocity (vehicle velocity) of the host vehicle 12, an acceleration sensor that detects acceleration, a lateral G sensor that detects lateral G, a yaw rate sensor that detects angular velocity around a vertical axis, a direction sensor that detects orientation and direction, and a gradient sensor that detects a gradient, and outputs detections signals from each of these sensors to the control system 16. These detection signals are stored as host vehicle information 56 in a prescribed memory region of the storage apparatus 52.

The automated driving switch 28 is formed from a pushbutton hardware switch or a software switch using the navigation apparatus 24, for example. The automated driving switch 28 is configured to be able to switch among a plurality of driving modes in response to manual manipulation by a user, including the driver.

The manipulation device 30 is formed to include an acceleration pedal, a steering wheel, a brake pedal, a shift stick, and a direction indicating lever. The manipulation detection sensor 32 that detects whether there is a manipulation by the driver, the amount of this manipulation, and the position of this manipulation is attached to the manipulation device 30.

The manipulation detection sensor 32 outputs an acceleration pedal depression amount (acceleration pedal opening amount), a steering wheel manipulation amount (steering amount), a brake pedal depression amount, a shift position, a right/left turn direction, and the like as detection results to a travel control section 58 of the control system 16, which is described further below.

<1.3. Specific Configuration of the Output System Apparatus Group 18>

The drive force apparatus 34 is formed from a drive force ECU (Electronic Control Unit) and a drive source including an engine and drive motor. The drive force apparatus 34 generates the travel drive force (torque) of the host vehicle 12 according to a travel control value input from the travel control section 58, and transmits this travel drive force to the wheels either directly or via a transmission.

The steering apparatus 36 is formed from an EPS (Electric Power Steering) ECU and an EPS apparatus. The steering apparatus 36 changes the orientation of the wheels (steered wheels) according to the travel control value input from the travel control section 58.

The braking apparatus 38 is an electric servo brake that also uses a hydraulic brake, for example, and is formed from a brake ECU and a brake actuator. The braking apparatus 38 brakes the wheels according to a travel control value input from the travel control section 58.

The notification apparatus 40 is formed from a notification ECU, a display apparatus, and an audio apparatus. The notification apparatus 40 provides notification relating to automated driving or manual driving, in response to notification instructions output from a notification control section 60 of the control system 16, which is described further below. The direction indicator 42 provides notification relating to a left or right turn of the host vehicle 12, in response to notification instructions output from the notification control section 60.

<1.4. Configuration of the Control System 16>

The control system 16 is formed by one or more ECUs, and includes the storage apparatus 52, the travel control section 58, and the notification control section 60 described above, as well as sections for realizing various functions. In the present embodiment, the function realizing sections are software function sections that realize functions by having one or more CPUs (Central Processing Units) execute programs stored in the non-transitory storage apparatus 52. Instead, the function realizing sections may be hardware function sections made from an integrated circuit such as an FPGA (Field-Programmable Gate Array).

The control system 16 is formed to include the storage apparatus 52, the travel control section 58, and the notification control section 60, as well as an outdoor recognizing section 62, an action planning section 64, and an intersection processing section 66.

The outdoor recognizing section 62 uses the various pieces of information (e.g. the outdoor information from the outdoor sensor 20) input by the input system apparatus group 14 to recognize lane markers (white lines) on both sides of the host vehicle 12 and generate "static" outdoor recognition information including position information of stop lines and/or traffic signals or regions where travel is possible. Furthermore, the outdoor recognizing section 62 uses the various pieces of information input thereto to generate "dynamic" outdoor recognition information including obstructions such as stopped vehicles or the like; traffic participants such as people, other vehicles, and/or the like; or the color of traffic signals.

The action planning section 64 creates an action plan (time sequence of events) for every travel segment, based on the recognition results obtained by the outdoor recognizing section 62, and updates this action plan as necessary. The types of events are deceleration, acceleration, branching, merging, intersection, staying in the lane, lane change, and overtaking, for example. Here, "deceleration" and "acceleration" are events causing the host vehicle 12 to decelerate or accelerate. "Branching", "merging", and "intersection" are events causing the host vehicle 12 to travel smoothly at a branching point, a merging point or intersection. "Lane change" is an event causing the host vehicle 12 to change the travel lane, e.g. to change course. "Overtaking" is an event causing the host vehicle 12 to overtake a vehicle travelling in front of the host vehicle 12.

Furthermore, "staying in the lane" is an event causing the host vehicle 12 to travel without deviating from the travel lane, and can be broken down according to combinations of travel conditions. Specific travel conditions include travel at constant speed, travel to follow, travel to decelerate, travel on a curve, and travel to avoid obstacles.

Furthermore, the action planning section 64 uses the map information 50, the route information 54, and the host vehicle information 56 read from the storage apparatus 52 to generate a travel trajectory (a time sequence of target behaviors) according to the created action plan. This travel trajectory is, specifically, a time-sequence data set in which the position, attitude angle, velocity, acceleration, curvature, yaw rate, and steering angle are data units.

The intersection processing section 66 uses the various pieces of information from the outdoor recognizing section 62 or the action planning section 64 to perform processing relating to passage through an intersection (proceeding straight or making a left or right turn). The intersection processing section 66 then outputs an instruction signal for performing the processing described above toward the action planning section 64 or the notification control section 60. In this case, the intersection processing section 66 functions as an intersection detecting section 68, an information acquiring section 70, a traffic signal detecting section 72, a traffic signal selecting section 74, a traffic signal recognizing section 78, and a possibility determining section 80.

The travel control section 58 determines various travel control values for controlling the travel of the host vehicle 12, including at least a value for controlling acceleration and deceleration of the host vehicle 12, in accordance with the travel trajectory (time sequence of target behaviors) generated by the action planning section 64. The travel control section 58 then outputs each acquired travel control value to the drive force apparatus 34, the steering apparatus 36, and the braking apparatus 38.

The notification control section 60 controls the drive of the notification apparatus 40 or the direction indicator 42 according to the instructions from the intersection processing section 66 and the travel trajectory generated by the action planning section 64. Below, there are cases where the travel control section 58 and the notification control section 60 are referred to collectively as a "driving control section 82".

<1.5. Arrangement of Outdoor Sensors 20 in Host Vehicle 12>

FIG. 2 is a descriptive diagram schematically showing an arrangement of the outdoor sensors 20 on the host vehicle 12.

The cameras 44 arranged on the host vehicle 12 include a front camera (first camera) 44a provided on the front of the roof, a front left camera (second camera) 44b arranged on the driver seat side of the vehicle body 84, a front right camera (second camera) 44c arranged on the front passenger seat side of the vehicle body 84, a rear left camera (second camera) 44d arranged on the rear left passenger seat side, a rear right camera (second camera) 44e arranged on the rear right passenger seat side, a rear camera 44f provided on the rear of the roof, and a front camera (first camera) 44g that is two stereo cameras provided on the front of the roof. For the sake of convenience in the following description, the front cameras 44a and 44g, the front left camera 44b, the front right camera 44c, the rear left camera 44d, the rear right camera 44e, and the rear camera 44f may be referred to collectively as the cameras 44a to 44g.

In this case, the plurality of cameras 44 (44a to 44g) are provided to the host vehicle 12 such that, when the host vehicle 12 performs the turning operation of a left or right turn, the cameras 44 are arranged on the outer side relative to the turn direction (left or right turn direction) of the host vehicle 12. In other words, when the host vehicle 12 turns left (performs a turning operation in the left direction), the front camera 44a, the front right camera 44c, the rear right camera 44e, and the rear camera 44f are arranged in the stated order on the outer side of the host vehicle 12 relative to the left turn direction (i.e. on the right side of the host vehicle 12). Furthermore, when the host vehicle 12 turns right (performs a turning operation in the right direction), the front camera 44a, the front left camera 44b, the rear left camera 44d, and the rear camera 44f are arranged in the stated order on the outer side of the host vehicle 12 relative to the right turn direction (i.e. on the left side of the host vehicle 12).

The front camera 44a captures an image within a prescribed region (imaging region 86a) in front of the host vehicle 12, and outputs the captured image to the control system 16. The front left camera 44b captures an image within a prescribed region (imaging region 86b) to the left of the host vehicle 12, and outputs the captured image to the control system 16. The front right camera 44c captures an image within a prescribed region (imaging region 86c) to the right of the host vehicle 12, and outputs the captured image to the control system 16. In this case, the imaging region 86a that is a front region and the imaging region 86b that is a left side region partially overlap. Furthermore, the imaging region 86a and the imaging region 86c that is a right side region partially overlap.

Although not shown in the drawings, the rear left camera 44d, the rear right camera 44e, the rear camera 44f, and the front camera 44g each capture an image of a prescribed region outside of the host vehicle 12 toward which the lens thereof is pointed, such that these regions partially overlap, and output the captured image to the control system 16.

Furthermore radars 46 and LIDARs 48 are also arranged on the host vehicle 12. The radars 46 include three radars 46a to 46c arranged at the front of the vehicle body 84 and two radars 46d and 46e arranged at the rear of the vehicle body 84. The LIDARs 48 include two LIDARs 48a and 48b arranged at the front of the vehicle body 84 and three LIDARs 48c to 48e arranged at the rear of the vehicle body 84.

[2. Operation of the Vehicle Control Apparatus 10]

The vehicle control apparatus 10 according to the present embodiment is configured as described above. The following describes the operation of the vehicle control apparatus 10 when making a left or right turn at an intersection, while mainly referring to the flow charts of FIG. 3 to FIG. 5. Here, a case is described in which the host vehicle 12 with the vehicle control apparatus 10 mounted therein is travelling on the right side of the road with automated driving, and makes a left turn at an intersection 90 shown in FIG. 6.

<2.1. Description of the Intersection 90>

Figure 6:
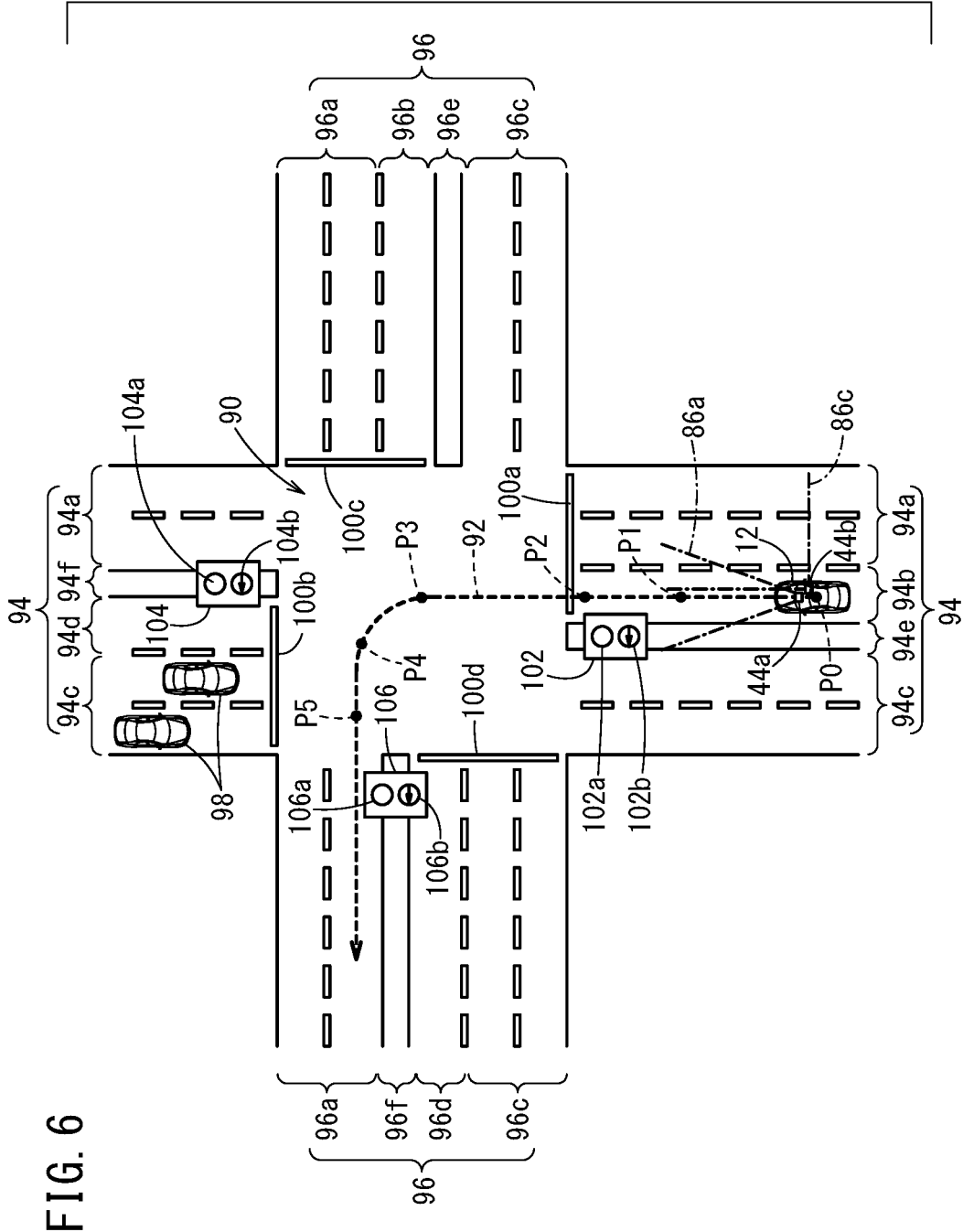
FIG. 6 shows a case where the host vehicle enters into the intersection.

FIG. 6 shows a state in which the host vehicle 12 is attempting to proceed into the intersection 90. The host vehicle 12 attempts to pass through the intersection 90 where a first road 94 and a second road 96 intersect, along the scheduled travel route 92 indicated by the dashed-line arrow. The first road 94 and the second road 96 are each 5-lane roads.

Specifically, the first road 94 is formed including a first travel lane region 94a including two lanes on which vehicles can proceed straight, a first left-turn lane 94b that is adjacent to the first travel lane region 94a and is a lane in which vehicles, including the host vehicle 12, can turn left, a first opposing lane region 94c that is opposite to the first travel lane region 94a and includes two lanes on which opposing vehicles 98 can proceed straight, and a first left-turn lane 94d that is adjacent to the first opposing lane region 94c and is a lane in which the opposing vehicles 98 can turn left.

In this case, as seen from the host vehicle 12, on the close side of the intersection 90, the three travel lanes formed by the first travel lane region 94a and the first left-turn lane 94b and the two lanes of the first opposing lane region 94c are separated by a divider 94e. Furthermore, on the far side of the intersection 90 (beyond the intersection 90 in the progression direction of the vehicle), the two lanes of the first travel lane region 94a and the three opposing lanes formed by the first opposing lane region 94c and the first left-turn lane 94d are separated by a divider 94f.

In other words, the side of the first road 94 in front of the intersection 90 is formed as a 5-lane road including the first travel lane region 94a, the first left-turn lane 94b, and the first opposing lane region 94c, and the side of the first road 94 beyond the intersection 90 is formed as a 5-lane road by the first travel lane region 94a, the first opposing lane region 94c, and the first left-turn lane 94d.

On the other hand, in a similar manner as the first road 94, the second road 96 is formed including a second travel lane region 96a including two lanes on which vehicles can proceed straight, a second left-turn lane 96b that is adjacent to the second travel lane region 96a and is a lane in which vehicles can turn left, a second opposing lane region 96c that is opposite to the second travel lane region 96a and includes two lanes on which vehicles can proceed straight, and a second left-turn lane 96d that is adjacent to the second opposing lane region 96c and is a lane in which the opposing vehicles can turn left.

In this case, as seen from the host vehicle 12, on the right side of the intersection 90, the three travel lanes formed by the second travel lane region 96a and the second left-turn lane 96b and the two lanes of the second opposing lane region 96c are separated by a divider 96e. Furthermore, on the left side of the intersection 90, the two lanes of the second travel lane region 96a and the three opposing lanes formed by the second opposing lane region 96c and the second left-turn lane 96d are separated by a divider 96f.

Accordingly, the side of the second road 96 to the right of the intersection 90 is formed as a 5-lane road including the second travel lane region 96a, the second left-turn lane 96b, and the second opposing lane region 96c, and the side of the second road 96 to the left of the intersection 90 is formed as a 5-lane road by the second travel lane region 96a, the second opposing lane region 96c, and the second left-turn lane 96d.

Furthermore, the first travel lane region 94a and the first left-turn lane 94b, the first opposing lane region 94c and the first left-turn lane 94d, the second travel lane region 96a and the second left-turn lane 96b, and the second opposing lane region 96c and the second left-turn lane 96d are respectively provided with stop lines 100a to 100d directly in front of the intersection 90.

Traffic signals 102, 104, and 106, which indicate the progress-allowed/disallowed state when vehicles, including the host vehicle 12, travelling on the first left-turn lane 94b attempt to turn left, are installed respectively on the intersection 90 side of the divider 94e, the intersection 90 side of the divider 94f, and the intersection 90 side of the divider 96f. Each traffic signal 102 to 106 is a vertical traffic signal, and the traffic signals 102 to 106 are arranged in the stated order to be seen (recognized) when the host vehicle 12 turns left at the intersection 90 along the scheduled travel route 92.

Specifically, two display sections 102a and 102b are arranged vertically in the traffic signal 102 arranged on the intersection 90 side of the divider 94e. The two display sections 102a and 102b are arranged in the traffic signal 102 in a manner to face the vehicles, including the host vehicle 12, travelling in the first left-turn lane 94b. The lower display section 102b indicates that the current state is a progress-allowed state, using a green left-pointing arrow light that is a green signal. The upper display section 102a indicates that the current state is a progress-disallowed state, using a red light that is a red signal. Here, the "progress-allowed state" is a state where vehicles, including the host vehicle 12, are allowed to progress, and the "progress-disallowed state" is a state where vehicles, including the host vehicle 12, are prohibited from progressing.

Similarly, two display sections 104a and 104b are arranged vertically in the traffic signal 104 arranged on the intersection 90 side of the divider 94f. The two display sections 104a and 104b are arranged in the traffic signal 104 in a manner to face the vehicles, including the host vehicle 12, travelling in the first left-turn lane 94b. The lower display section 104b indicates that the current state is the progress-allowed state, using a green left-pointing arrow light (green signal). The upper display section 104a indicates that the current state is the progress-disallowed state, using a red light (red signal).

Furthermore, two display sections 106a and 106b are arranged vertically in the traffic signal 106 arranged on the intersection 90 side of the divider 96f. The two display sections 106a and 106b are arranged in the traffic signal 106 in a manner to face the vehicles, including the host vehicle 12, turning left in the intersection 90. The lower display section 106b indicates that the current state is the progress-allowed state, using a green left-pointing arrow light (green signal). The upper display section 106a indicates that the current state is the progress-disallowed state, using a red light (red signal).

In the example of FIG. 6, each of the traffic signals 102 to 106 lights up the green left-pointing arrow (display sections 102b to 106b), indicating the progress-allowed state (left turn allowed state). In other words, FIG. 6 shows a case where it is decided that vehicles, including the host vehicle 12, travel on the right side of the road, and the host vehicle 12 turns left at the intersection 90. It should be noted that, in a geographical region where it is decided that vehicles, including the host vehicle 12, travel on the left side of the road, the host vehicle 12 would turn to the right at the intersection 90.

In FIG. 6, for convenience of the description, only the traffic signals 102 to 106 corresponding to the vehicle (host vehicle 12) entering into the intersection 90 from the first left-turn lane 94b to make a left turn are shown. In actuality, traffic signals are also arranged around the intersection 90 corresponding to each of the first travel lane region 94a, the first opposing lane region 94c, the first left-turn lane 94d, the second travel lane region 96a, the second left-turn lanes 96b and 96d, and the second opposing lane region 96c.

When the host vehicle 12 turns left at the intersection 90 traveling along the scheduled travel route 92, the traffic signals 102-106 may appear in images captured by the cameras 44 (44a-44g) provided for the host vehicle 12. FIGS. 7-12 shows, as an example, images captured by the front camera 44a and the front right camera 44c when the host vehicle 12 is at the host vehicle positions P0-P5 (current positions of the vehicle 12) on the scheduled travel route 92. These images contain the image information (traffic light information) of the traffic signals 102-106. In the explanations below, for convenience, items of the image information of the traffic signals 102-106 appearing in the images are called traffic signals 102-106. The images of FIGS. 7-12 will be explained in detail later.

<2.2. Description of the Operation of FIGS. 3 to 5>

Figure 3:
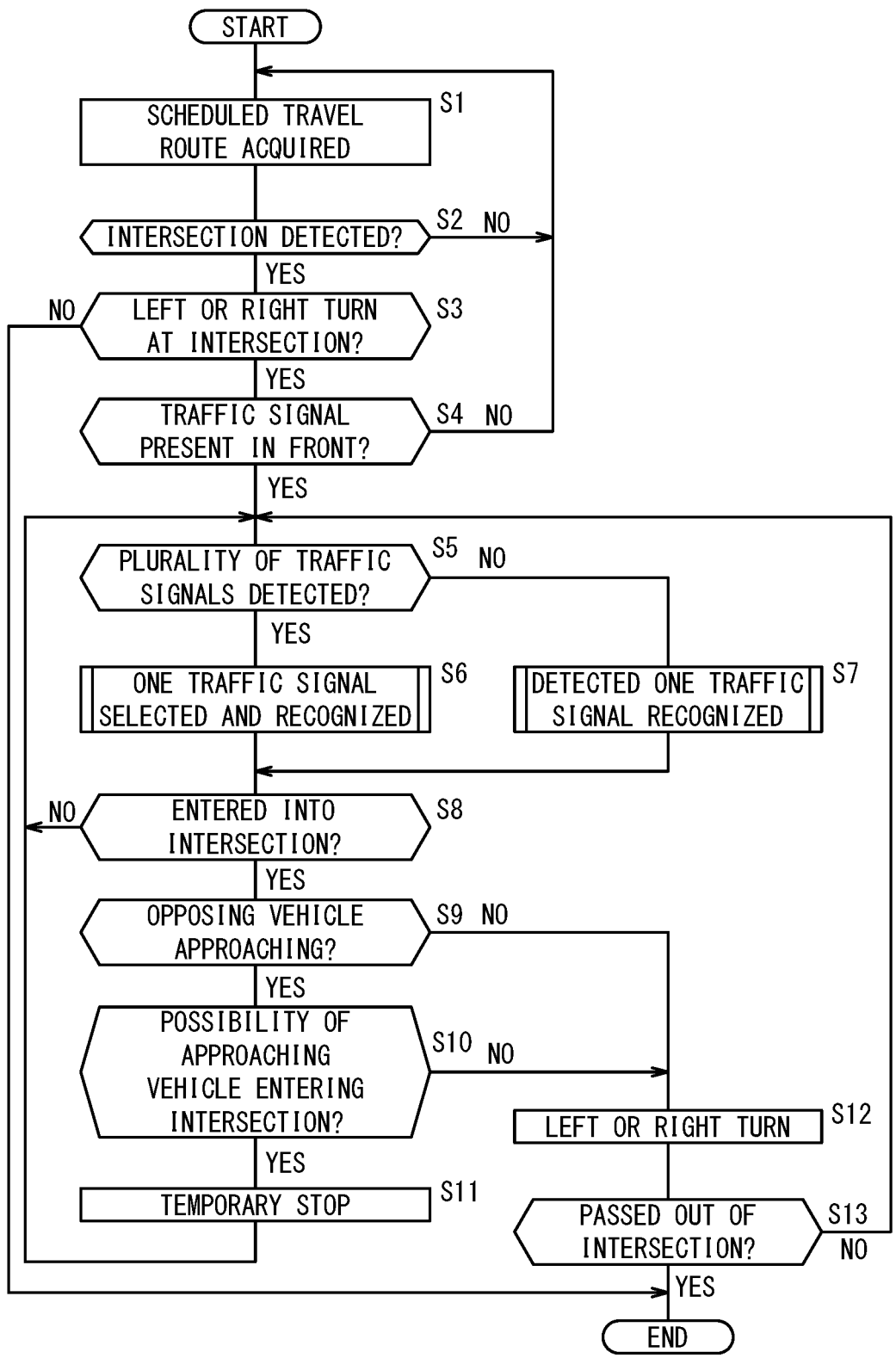
FIG. 3 is a flow chart provided to describe the operations of the vehicle control apparatus of FIG. 1.
Figure 4:
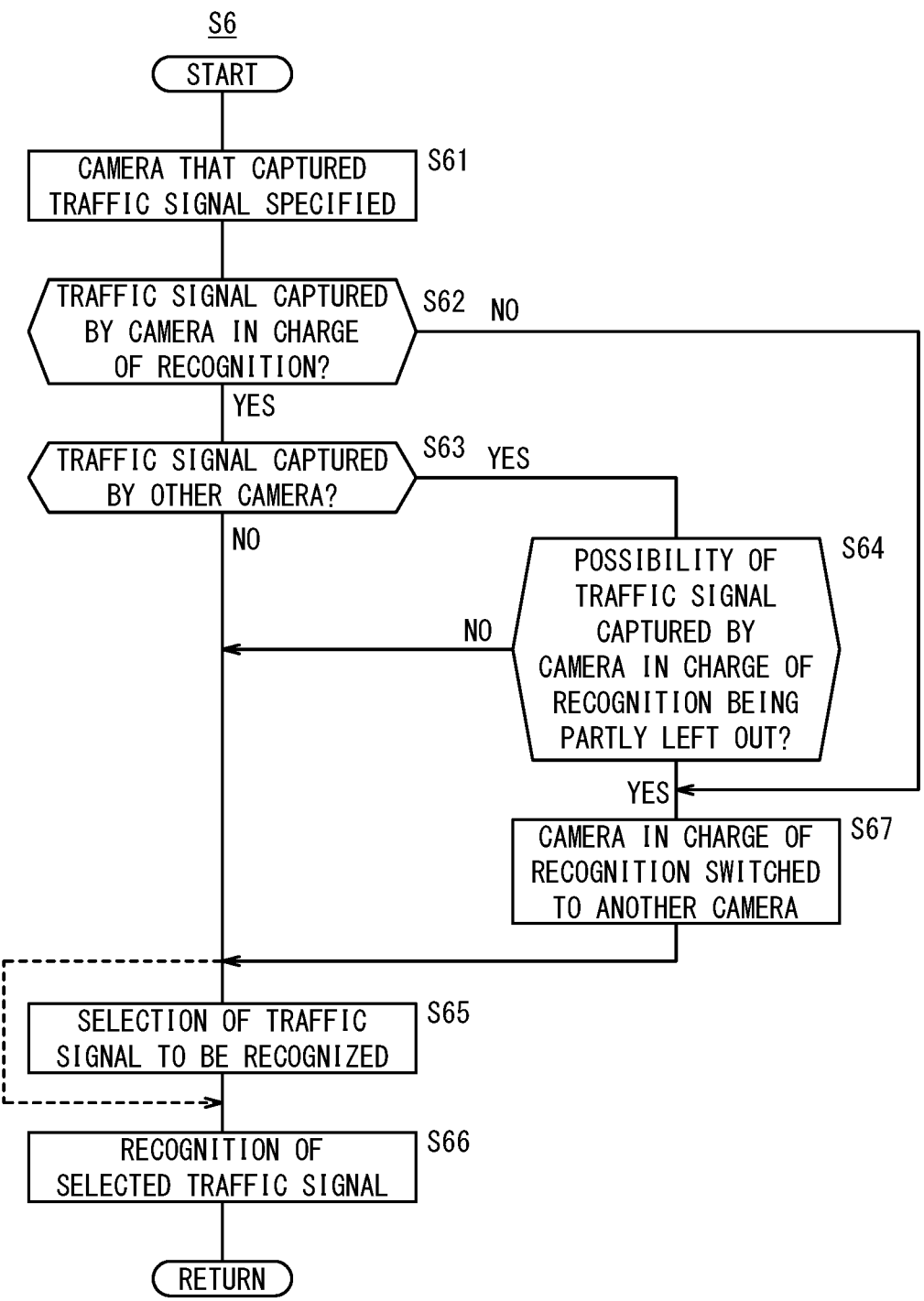
FIG. 4 is a flow chart showing the details of step S6 of FIG. 3.
Figure 5:
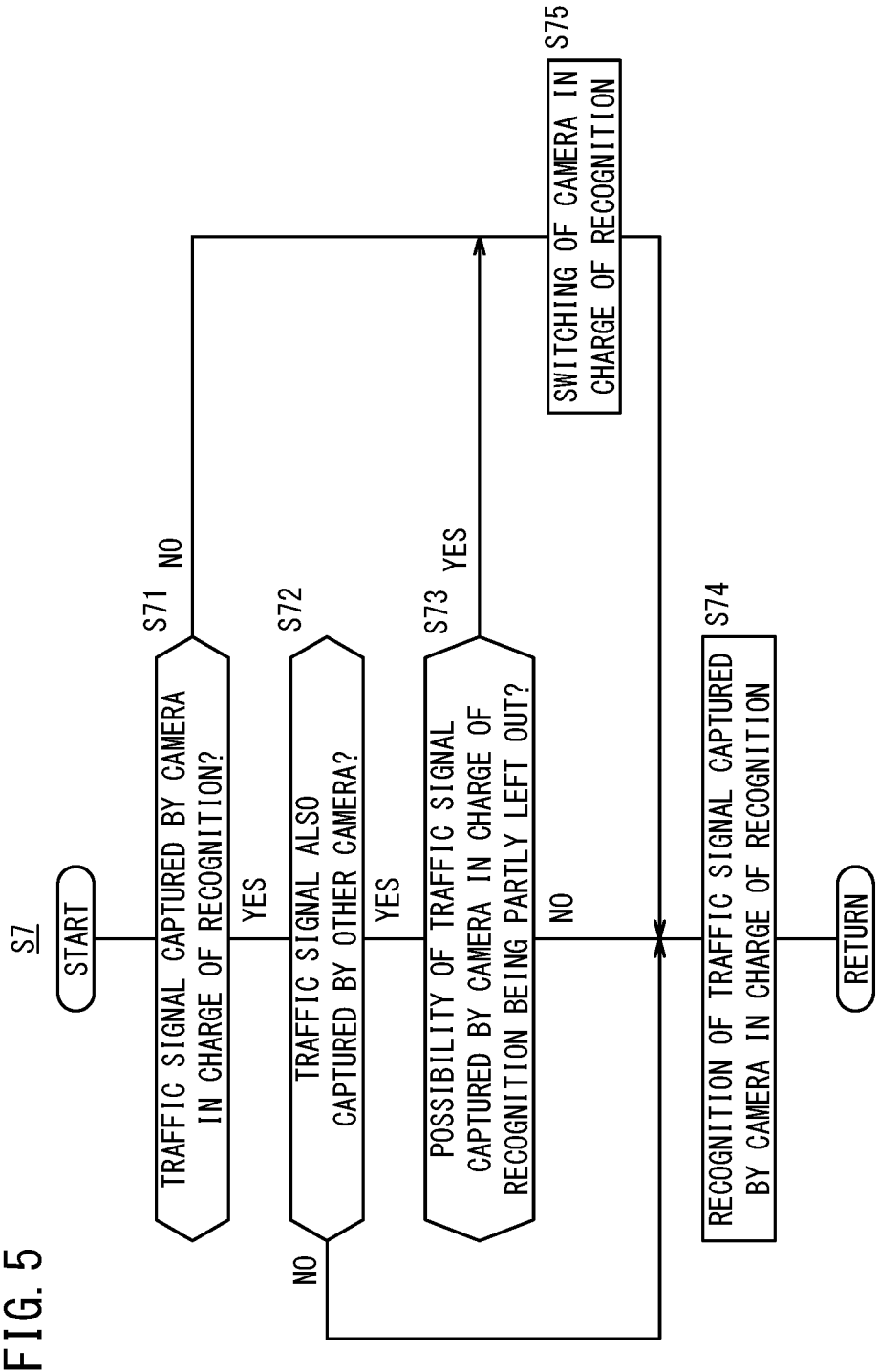
FIG. 5 is a flow chart showing the details of step S7 of FIG. 3.

The following describes the operation of the vehicle control apparatus 10 (see FIG. 1) shown in the flow charts of FIGS. 3 to 5, in correspondence with a situation (e.g. situations at each host vehicle position P0 to P5) where the host vehicle 12 (see FIGS. 2 and 6) is travelling along the scheduled travel route 92. In the description of this operation, a case is described in which the host vehicle 12 is turning left at the intersection 90 in a state where the lower display sections 102b to 106b of the respective traffic signals 102 to 106 have the green left-pointing arrow (green signal) lit up.

First, in a case where the host vehicle 12 is travelling on the first road 94 (in the first left-turn lane 94b), at step S1 of FIG. 3, the intersection processing section 66 (see FIG. 1) uses the route information 54 most recently stored in the storage apparatus 52 or the "static" outdoor recognition information generated by the outdoor recognizing section 62 to acquire the scheduled travel route 92 (see FIG. 6) on which the host vehicle 12 intends to travel.

At step S2, the intersection detecting section 68 detects the intersection 90 by considering the scheduled travel route 92 acquired at step S1 and the action plan (left or right turn event) created by the action planning section 64. As described above, the intersection 90 is an intersection that (1) is on the scheduled travel route 92, (2) has a plurality of lanes intersecting, (3) is a location where the host vehicle 12 is scheduled to make a left turn, and (4) is within a prescribed distance range from the current host vehicle position (e.g. the host vehicle position P0) or can be reached by the host vehicle 12 within a prescribed time range.

If the intersection 90 is not detected (step S2: NO), the process returns to step S1, and steps S1 and S2 are sequentially repeated. On the other hand, if the specified intersection 90 is detected (step S2: YES), the process proceeds to step S3.

At step S3, the intersection processing section 66 determines whether the host vehicle 12 is to turn left in the intersection 90. If the host vehicle 12 is not to turn left at the intersection 90, e.g. if the host vehicle 12 is to progress straight through the intersection 90 (step S3: NO), the process of FIGS. 3 to 5 is finished. Due to this, the vehicle control apparatus 10 causes the host vehicle 12 to travel straight, without performing the left turn operation (turning operation) at the intersection 90.

On the other hand, if the intersection 90 is to turn left in the intersection 90 (step S3: YES), the process proceeds to step S4. Accordingly, the processes of step S4 and onward are processes within the vehicle control apparatus 10 for making the host vehicle 12 turn left in the intersection 90 according to automated travel along the scheduled travel route 92. The following is a specific description of the processing of the vehicle control apparatus 10 for each host vehicle position P0 to P5. The processes of step S4 and onward are not limited to the host vehicle positions P0 to P5, and are performed at prescribed time intervals.

Furthermore, the vehicle control apparatus 10 is configured to have a first state for performing travel control of the host vehicle 12 based on the traffic signals 102 to 106 that appear in the images captured by the front cameras 44a and 44g, and a second state for performing travel control of the host vehicle 12 the based on the traffic signals 102 to 106 that appear in the images captured by the front left camera 44b, the front right camera 44c, the rear left camera 44d, or the rear right camera 44e.

As described further below, with the vehicle control apparatus 10, it is possible to perform travel control of the host vehicle 12 in the first state when the host vehicle 12 is travelling straight, and to transition from the first state to the second state to perform travel control of the host vehicle 12 while the host vehicle 12 turns left or right (performs the turning operation) in the intersection 90.

In the following description, as an example, a case is described in which, in the first state, the travel control of the host vehicle 12 is performed based on the images captured by the front camera 44a, and in the second state, the travel control of the host vehicle 12 is performed based on the images captured by the front right camera 44c.

(2.2.1 Processing Near Host Vehicle Position P0)

When the host vehicle 12 travels along the scheduled travel route 92 and reaches the host vehicle position P0, at step S4, the information acquiring section 70 acquires the captured images of the outside from the plurality of cameras 44 (44a to 44g) mounted on the host vehicle 12. Next, the traffic signal detecting section 72 detects all of the traffic signals that appear in the plurality of images acquired by the information acquiring section 70. Specifically, the traffic signal detecting section 72 detects all of the traffic signals that appear in each image in which the traffic signals (traffic signals 102 to 106) relating to the travel control of automated travel of the host vehicle 12 appear. Accordingly, it should be noted that at step S4, there are cases where the detected traffic signals are not limited to each traffic signal provided around the intersection 90, and traffic signals not at the intersection 90 are detected.

Figure 7:
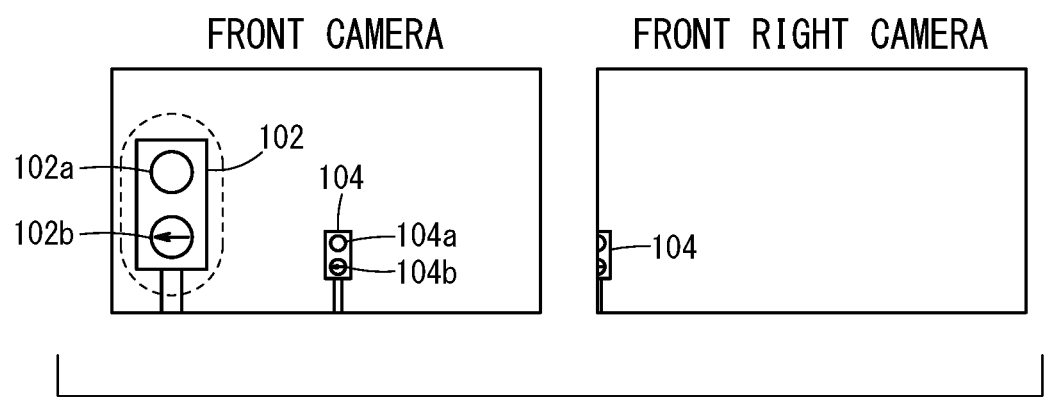
FIG. 7 shows images captured by two cameras at the host vehicle position P0 of FIG. 6.

Next, the traffic signal detecting section 72 determines whether a traffic signal in front of the host vehicle 12 in the progression direction has been detected. FIG. 7 shows an image (image on the left side in FIG. 7) captured by the front camera 44a and an image (image on the right side in FIG. 7) captured by the front right camera 44c, when the host vehicle 12 is at the host vehicle position P0. As shown in FIGS. 2 and 6, the front camera 44a captures an image of the imaging region 86a in front of the host vehicle 12, and therefore the two traffic signals 102 and 104 in front of the host vehicle 12 appear in the image on the left side in FIG. 7. Furthermore, the front right camera 44c captures an image of the imaging region 86c to the front and right of the host vehicle 12, and therefore a portion of the traffic signal 104 in front of the host vehicle 12 appears in the image on the right side in FIG. 7. In other words, since the imaging regions 86a and 86c partially overlap, the traffic signal 104 appears in both of the two images in FIG. 7.

In this case, the traffic signal detecting section 72 judges that the traffic signal 104 appearing in the two images is the same traffic signal 104, based on the signal period, display color, display pattern, installation position, or surrounding environment of the traffic signal 104 appearing in the two images, for example.

By performing these processes, the traffic signal detecting section 72 determines that the two traffic signals 102 and 104 have been detected in front (step S4: YES), and the process proceeds to step S5. On the other hand, at step S4, if no traffic signals can be detected in front (step S4: NO), the processes returns to step S1 and the processes of step S1 to S4 are performed again.

At step S5, the traffic signal selecting section 74 determines whether the traffic signal detecting section 72 has detected a plurality of traffic signals. If the traffic signal detecting section 72 has detected a plurality of traffic signals (step S5: YES), the process proceeds to step S6. On the other hand, if the traffic signal detecting section 72 has detected only one traffic signal (step S5: NO), the process proceeds to step S7.

In this case, since the traffic signal detecting section 72 detects the two traffic signals 102 and 104 (step S5: YES), the process proceeds to step S6 and the traffic signal selecting section 74 selects one traffic signal from among the two traffic signals 102 and 104. Furthermore, the traffic signal recognizing section 78 recognizes the selected one traffic signal (recognition target traffic signal). Specifically, the process shown in FIG. 4 is performed at step S6.

At step S61 of FIG. 4, the traffic signal selecting section 74 specifies the front camera 44a and the front right camera 44c, which are cameras that captured images in which the two traffic signals 102 and 104 appear.

At step S62, the traffic signal selecting section 74 determines whether a traffic signal appears in the image captured by a camera in charge of recognition. Here, the camera in charge of recognition refers to a camera that has captured an image in which a traffic signal (recognition target traffic signal) to be recognized by the traffic signal recognizing section 78 appears. Usually, the front camera 44a is set by default (fixed) as the camera in charge of recognition, in consideration of cases where the vehicle control apparatus 10 performs travel control of the host vehicle 12 in the first state by making the host vehicle 12 travel straight. Accordingly, the traffic signal selecting section 74 determines whether the traffic signals 102 and 104 appear in the image (image on the left side in FIG. 7) captured by the front camera 44a. In this case, the traffic signal selecting section 74 makes an affirmative determination (step S62: YES), and the process proceeds to step S63.

At step S63, the traffic signal selecting section 74 determines whether a traffic signal is also captured by a camera other than the camera in charge of recognition (front camera 44a). In this case, the traffic signal 104 appears in the image (image on the right side in FIG. 7) captured by the front right camera 44c, and therefore the traffic signal selecting section 74 makes an affirmative determination (step S63: YES), and the process proceeds to step S64.

At step S64, the traffic signal recognizing section 78 determines whether there is a possibility that the traffic signals 102 and 104 that appear in the image captured by the front camera 44*a* will be partly out of the image (hereinafter "partly out of" means "partly or entirely out of"). In this case, the host vehicle 12 is at the host vehicle position P0 and is travelling straight along the scheduled travel route 92 in the first left-turn lane 94*b*, and therefore the traffic signal recognizing section 78 determines that there is no possibility that the traffic signals 102 and 104 will be partly out of the image, i.e. that the first state should be maintained (step S64: NO), and the process proceeds to step S65.

At step S65, the traffic signal selecting section 74 receives the negative determination result of step S64, and selects one of the two traffic signals 102 and 104 as the recognition target traffic signal. In this case, the traffic signal selecting section 74 selects the traffic signal 102 that appears relatively large in the image on the left side in FIG. 7, for example, as the recognition target traffic signal. In other words, the reason that the traffic signal that appears large is selected as the recognition target traffic signal is that the traffic signal recognizing section 78 can more accurately perform the recognition process on this recognition target traffic signal. In FIG. 7, the selection of the traffic signal 102 appearing in the image captured by the front camera 44*a*, which is the camera in charge of recognition, is indicated by a dashed line.

At step S66, the traffic signal recognizing section 78 recognizes the traffic signal 102 selected by the traffic signal selecting section 74 as the recognition target traffic signal. When the process of step S66 is completed, the process of step S6 ends and the process moves to step S8 of FIG. 3.

At step S8, the intersection processing section 66 determines whether the host vehicle 12 has entered into the intersection 90. In this case, the host vehicle 12 is at the host vehicle position P0, and therefore has not entered into the intersection 90 (see FIG. 6). Accordingly, the intersection processing section 66 makes a negative determination (step S8: NO). As a result, the process returns to step S5, and the vehicle control apparatus 10 again performs the processes of steps S5 to S8.

(2.2.2. Processing Near Host Vehicle Position P1)

Figure 8:
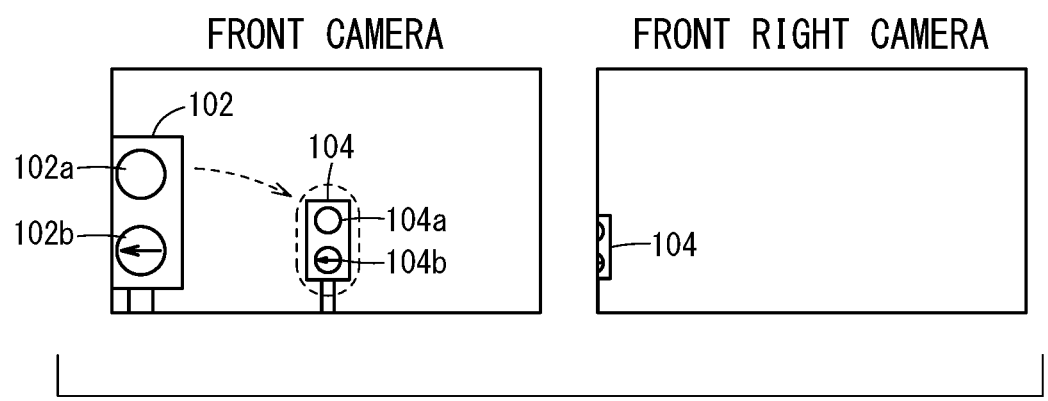
FIG. 8 shows images captured by two cameras at the host vehicle position P1 of FIG. 6.

Next, when the host vehicle 12 has reached the host vehicle position P1, at step S5, the traffic signal selecting section 74 again determines whether the traffic signal detecting section 72 has detected a plurality of traffic signals. FIG. 8 shows images captured respectively by the front camera 44*a* and the front right camera 44*c* at the host vehicle position P1. In this case as well, in the same manner as in FIG. 7, the two traffic signals 102 and 104 appear in the image on the left side of FIG. 8 (the image captured by the front camera 44*a*) and part of the one traffic signal 104 appears in the image on the right side in FIG. 8 (the image captured by the front right camera 44*c*). It should be noted that part of the traffic signal 102 fails to appear in the image on the left side.

The traffic signal detecting section 72 detects the two traffic signals 102 and 104 (step S5: YES), and the process proceeds to step S6. At step S61 of FIG. 4, the traffic signal selecting section 74 specifies the front camera 44*a* and the front right camera 44*c* that captured the images in which the traffic signals 102 and 104 appear, and at step S62, the traffic signal selecting section 74 determines whether the traffic signal 104 is captured by the camera in charge of recognition (front camera 44*a*). Since the traffic signals 102 and 104 are captured by the front camera 44*a* (step S62: YES), the traffic signal selecting section 74 moves the process to step S63. The traffic signal 104 appears in the image (image on the right side in FIG. 8) captured by the front right camera 44*c* (step S63: YES), and therefore the traffic signal selecting section 74 moves the process to step S64.

At step S64, the traffic signal recognizing section 78 judges whether there is a possibility that the traffic signals 102 and 104 that appear in the image captured by the front camera 44*a* will be partly out of the image. In this case, even though the host vehicle 12 has progressed straight from the host vehicle position P1, there is no possibility that the traffic signal 104 will be partly out of the image (step S64: NO), and therefore the process proceeds to step S65. Here, the traffic signal recognizing section 78 may judge that there is a possibility that the traffic signal 102 that appears in this image will be partly out of the image, due to the host vehicle 12 travelling straight.

Due to this, at step S65, the traffic signal selecting section 74 receives the determination result of step S64, and selects the traffic signal 104 as the recognition target traffic signal. In other words, although the traffic signal 102 appears large in the image on the left side in FIG. 8, there is a possibility that the traffic signal 102 will be partly out of the image, and therefore the traffic signal recognizing section 78 cannot accurately perform the recognition process. In FIG. 8, the switching of the recognition target traffic signal from the traffic signal 102 to the traffic signal 104 is shown by a dashed line. As a result, at step S66, the traffic signal recognizing section 78 recognizes the traffic signal 104 selected by the traffic signal selecting section 74 as the recognition target traffic signal, and the process of step S6 ends.

Since the host vehicle position P1 is a position in front of the intersection 90, at step S8, the intersection processing section 66 determines that the host vehicle 12 has not entered into the intersection 90 (step S8: NO). As a result, the process returns to step S5, and the vehicle control apparatus 10 again performs the processes of steps S5 to S8.

(2.2.3. Processing Near Host Vehicle Position P2)

Figure 9:
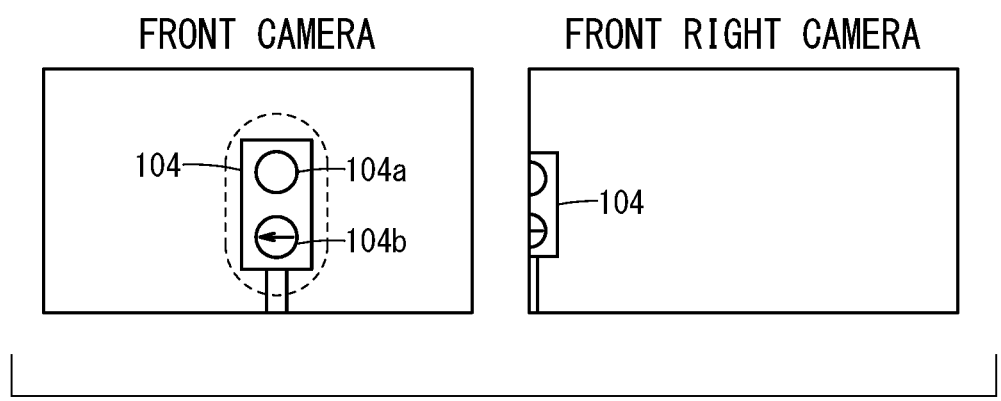
FIG. 9 shows images captured by two cameras at the host vehicle position P2 of FIG. 6.

Next, when the host vehicle 12 has arrived at the host vehicle position P2 directly in front of the stop line 100*a* (in front of the intersection 90), the traffic signal selecting section 74 again performs the determination process of step S5. FIG. 9 shows images captured respectively by the front camera 44*a* and the front right camera 44*c* at the host vehicle position P2. The host vehicle position P2 is a position closer to the intersection 90 than the installation position of the traffic signal 102 is, and only the one traffic signal 104 appears in the image on the left side in FIG. 9 (the image captured by the front camera 44*a*) and the image on the right side in FIG. 9 (the image captured by the front right camera 44*c*).

Accordingly, the traffic signal detecting section 72 detects only one traffic signal 104 (step S5: NO), and the process proceeds to step S7. In this case, the traffic signal detecting section 72 can judge that the traffic signal 104 that appears in the two images of FIG. 9 is the same traffic signal 104, based on the signal period, the display color, the display pattern, the installation position, and the surrounding environment of these traffic signals. Then, at step S7, the traffic signal recognizing section 78 recognizes the one traffic signal (recognition target traffic signal). The details of the process performed at step S7 are shown in FIG. 5.

At step S71 of FIG. 5, the traffic signal recognizing section 78 determines whether a traffic signal appears in the image captured by the camera in charge of recognition (front camera 44*a*). The traffic signal 104 appears in this image, and therefore the traffic signal recognizing section 78 makes an affirmative determination (step S71: YES), and the process proceeds to step S72.

At step S72, the traffic signal recognizing section 78 determines whether a traffic signal is also captured by a camera other than the front camera 44a. The traffic signal 104 appears in the image captured by the front right camera 44c (the image on the right side in FIG. 9), and therefore the traffic signal recognizing section 78 makes an affirmative determination (step S72: YES), and the process proceeds to step S73.

At step S73, the traffic signal recognizing section 78 judges whether there is a possibility that the traffic signal 104 that appears in the image captured by the front camera 44a will be partly out of the image. In this case, the host vehicle 12 is at the host vehicle position P2 and travelling straight along the scheduled travel route 92 in front of the stop line 100a, and therefore the traffic signal recognizing section 78 judges that there is no possibility that the traffic signal 104 will be partly out of the image, i.e. that the first state should be maintained (step S73: NO), and the process proceeds to step S74.

At step S74, the traffic signal recognizing section 78 recognizes the traffic signal 104 appearing in the image on the left side in FIG. 9 as the recognition target traffic signal, based on the determination result of step S73. When the process of step S74 is completed, the process of step S7 ends, and the process moves to step S8 of FIG. 3. In FIG. 9, the traffic signal 104 being recognized as the recognition target traffic signal is indicated by a dashed line.

At step S8, the host vehicle 12 is at the host vehicle position P2 and has not entered into the intersection 90, and therefore the intersection processing section 66 makes a negative determination (step S8: NO). As a result, the process returns to step S5 and the intersection processing section 66 again performs the processes of steps S5 to S8.

(2.2.4. Processing Near Host Vehicle Position P3)

Figure 10:
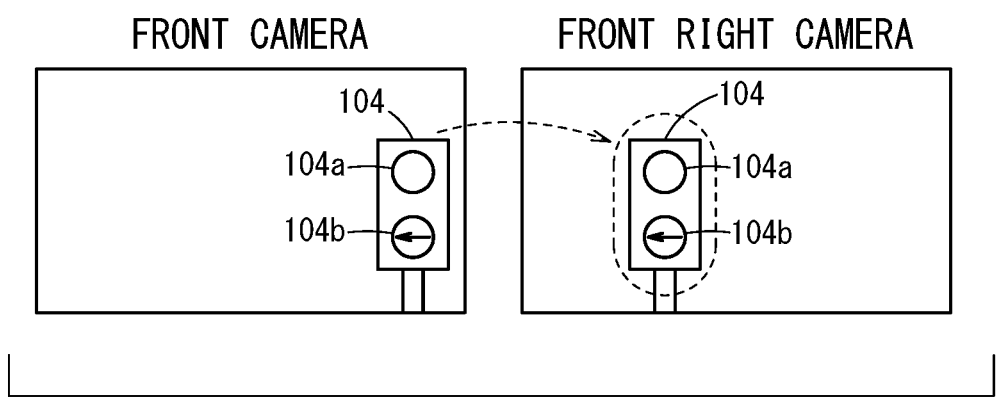
FIG. 10 shows images captured by two cameras at the host vehicle position P3 of FIG. 6.

Next, when the host vehicle 12 has entered the intersection 90, started the left turn (turning) on the scheduled travel route 92, and reached the host vehicle position P3, the traffic signal selecting section 74 again performs the determination process of step S5. FIG. 10 shows images captured respectively by the front camera 44a and the front right camera 44c at the host vehicle position P3. The host vehicle position P3 is a position opposite the traffic signal 104, and therefore only the one traffic signal 104 appears in the image on the left side in FIG. 10 (the image captured by the front camera 44a) and the image on the right side in FIG. 10 (the image captured by the front right camera 44c).

Accordingly, the traffic signal detecting section 72 detects only the one traffic signal 104 (step S5: NO), and the process proceeds to step S7. At step S71 of FIG. 5, the traffic signal 104 appears in the image captured by the camera in charge of recognition (front camera 44a) (step S71: YES), and therefore the traffic signal recognizing section 78 moves the process to step S72. At step S72, the traffic signal 104 appears in the image captured by the front right camera 44c (image on the right side in FIG. 10) (step S72: YES), and therefore the traffic signal recognizing section 78 moves the process to step S73.

At step S73, the traffic signal recognizing section 78 judges whether there is a possibility that the traffic signal 104 that appears in the image on the left side in FIG. 10 will be partly out of the image. In this case, the host vehicle 12 is at the host vehicle position P3, and then turns (turns left) significantly along the scheduled travel route 92, and therefore the traffic signal recognizing section 78 determines that there is a possibility that the traffic signal 104 will be partly out of the image, i.e. that it is necessary to transition from the first state to the second state (step S73: YES), and the process proceeds to step S75.

At step S75, the traffic signal recognizing section 78 switches the front right camera 44c, which is another camera that captured the traffic signal 104, to be the camera in charge of recognition. Specifically, while the host vehicle 12 is turning left (during the turning operation), the vehicle control apparatus 10 transitions from the first state to the second state and changes the camera in charge of recognition from the front camera 44a to the front right camera 44c, thereby making it possible to use the information of the traffic signal 104 that is possibly out of the image and avoid a decrease in the accuracy of the recognition process performed by the traffic signal recognizing section 78. After the transition from the first state to the second state and the switching of the camera in charge of recognition in this manner (after the change), the process proceeds to step S74.

In FIG. 10, the switching of the camera in charge of recognition from the front camera 44a to the front right camera 44c is indicated by a dashed-line arrow. Furthermore, when switching the camera in charge of recognition, the traffic signal recognizing section 78 uses the detection result of the traffic signal detecting section 72 (the result indicating that the traffic signals 104 appearing in the two images are the same traffic signal) to determine that there is a single recognition target traffic signal, and then transitions from the first state to the second state and switches the camera in charge of recognition from the front camera 44a to the front right camera 44c.

At step S74, the traffic signal recognizing section 78 recognizes, as the recognition target traffic signal, the traffic signal 104 that appears in the image (image on the right side in FIG. 10) captured by the front right camera 44c, which is the camera in charge of recognition after the switch, based on the results of the switching process of step S75. When the process of step S74 is completed, the process of step S7 ends, and the process moves to step S8 of FIG. 3.

In step S74 after step S75, the front right camera 44c is set as the camera in charge of recognition, but if the traffic signal 104 appears in the image captured by the front camera 44a, the traffic signal recognizing section 78 may continue the recognition process for the traffic signal 104 appearing in this image. In this way, after switching the camera in charge of recognition, travel control of the host vehicle 12 is not performed using the image of the front camera 44a, and when the left turn operation (turning operation) of the host vehicle 12 has been suspended, it is possible to lower the processing load or processing speed when switching the camera in charge of recognition from the front right camera 44c to the front camera 44a.

At step S8, the host vehicle 12 is at the host vehicle position P3 and has entered into the intersection 90 (step S8: YES), and therefore the intersection processing section 66 moves the process to step S9. At step S9, the possibility determining section 80 judges whether an opposing vehicle 98 is travelling toward the intersection 90. If an opposing vehicle is travelling toward the intersection 90 (step S9: YES), the process proceeds to step S10, where the possibility determining section 80 judges whether there is a possibility of the opposing vehicle 98 entering into the intersection 90. If there is a possibility of the opposing vehicle 98 entering into the intersection 90 (step S10: YES), at step S11, the possibility determining section 80 judges whether it is necessary to temporarily stop the host vehicle 12. In this way, the driving control section 82 performs travel control to temporarily stop the host vehicle 12 in the intersection 90. After this, the process returns to step S5, and the processes of steps S5 to S10 are performed again.

On the other hand, if the determination result is negative at step S9 or step S10 (step S9 or S10: NO), at step S12, the possibility determining section 80 judges that it is possible for the host vehicle 12 to turn left. In this way, the driving control section 82 performs travel control causing the host vehicle 12 to turn left in the intersection 90, in the second state. After this, at step S13, the intersection processing section 66 determines whether the host vehicle 12 has passed through the intersection 90. In this case, the host vehicle 12 is at the host vehicle position P3, and therefore the intersection processing section 66 judges that the host vehicle 12 has not left the intersection 90 (step S13: NO). After this, the process returns to step S5, and the processes of steps S5 to S13 are performed again.

(2.2.5. Processing Near Host Vehicle Position P4)

Figure 11:
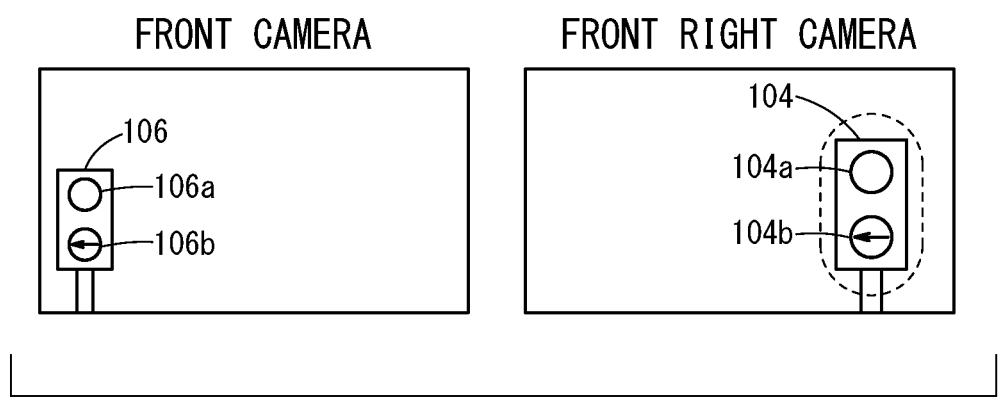
FIG. 11 shows images captured by two cameras at the host vehicle position P4 of FIG. 6.

Next, when the host vehicle 12 has turned left in the intersection 90 and reached the host vehicle position P4, the traffic signal selecting section 74 again performs the determination process of step S5. FIG. 11 shows images obtained respectively by the front camera 44a and the front right camera 44c at the host vehicle position P4. In this case, the one traffic signal 106 appears in the image on the left side in FIG. 10 (the image captured by the front camera 44a), and the one traffic signal 104 appears in the image on the right side in FIG. 10 (the image captured by the front right camera 44c).

Accordingly, the traffic signal detecting section 72 detects the two traffic signals 104 and 106 (step S5: YES), and the process proceeds to step S6. At step S61 (see FIG. 4), the traffic signal selecting section 74 specifies the front camera 44a and the front right camera 44c that captured the images in which the traffic signals 104 and 106 appear. Furthermore, the traffic signal selecting section 74 determines that the traffic signal 104 is captured by the front right camera 44c that is the camera in charge of recognition (step S62: YES) and that the traffic signal 106 is captured by the front camera 44a (step S63: YES), and the process proceeds to step S64.

At step S64, the traffic signal recognizing section 78 judges that there is no possibility that the traffic signal 104 that appears in the image captured by the front right camera 44c will be partly out of the image, i.e. judges that the second state should be maintained (step S64: NO), and the process proceeds to step S65. At step S65, the traffic signal selecting section 74 receives the determination result of step S64 and selects the traffic signal 104 as the recognition target traffic signal, and at step S66, the traffic signal recognizing section 78 recognizes the traffic signal 104 selected by the traffic signal selecting section 74 as the recognition target traffic signal and ends the process of step S6.

At step S8, the intersection processing section 66 judges that the host vehicle 12 is at the host vehicle position P4 and has entered into the intersection 90 (step S8: YES). Next, at step S9, in the same manner as for the case of the host vehicle position P3, the possibility determining section 80 judges that there is a possibility of an opposing vehicle 98 entering into the intersection 90 (steps S9, S10: YES) and then judges at the following step S11 that it is necessary to temporarily stop the host vehicle 12, after which the driving control section 82 performs travel control to temporarily stop the host vehicle 12 in the intersection 90. After this, the process returns to step S5, and the processes of steps S5 to S10 are performed again.

On the other hand, if the determination result is negative at step S9 or S10 (step S9 or s10: NO), at step S12, the possibility determining section 80 judges that the host vehicle 12 can turn left, and the driving control section 82 performs travel control causing the host vehicle 12 to turn left in the intersection 90. In this case, the host vehicle 12 is at the host vehicle position P4, and therefore, at step S13, the intersection processing section 66 judges that the host vehicle 12 has not left the intersection 90 (step S13: NO), after which the process returns to step S5 and the processes of steps S5 to S13 are repeated.

(2.2.6. Processing Near Host Vehicle Position P5)

Figure 12:
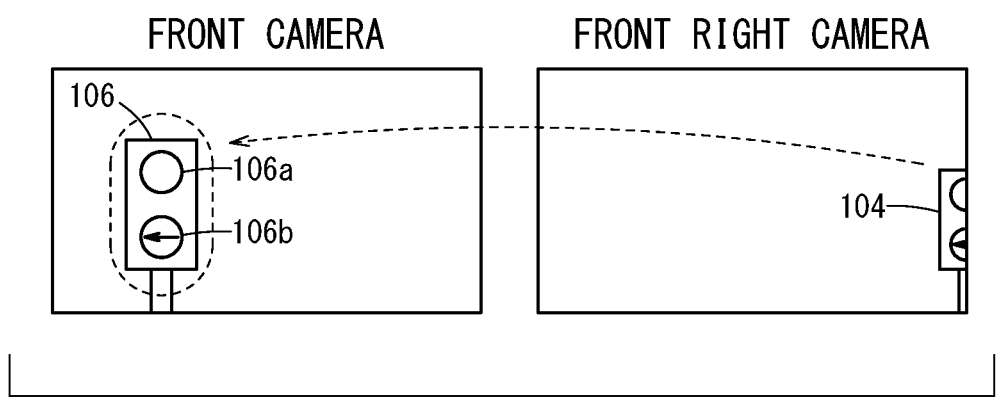
FIG. 12 shows images captured by two cameras at the host vehicle position P5 of FIG. 6.

Next, when the host vehicle 12 has reached the host vehicle position P5 in the intersection 90, the traffic signal selecting section 74 again performs the determination process of step S5. FIG. 12 shows images captured respectively by the front camera 44a and the front right camera 44c at the host vehicle position P5. In the same manner as the case of the host vehicle position P4 (see FIG. 11), the one traffic signal 106 appears in the image on the left side in FIG. 12 (the image captured by the front camera 44a) and the one traffic signal 104 appears in the image on the right side in FIG. 12 (the image captured by the front right camera 44c).

Accordingly, in the case of the host vehicle position P5, processing is performed in the order of "step 5: YES"→step S61 of step S6→"step S62: YES"→"step S63: YES"→step S64.

It should be noted that, at step S64, the traffic signal recognizing section 78 judges that there is a possibility that the traffic signal 104 that appears in the image captured by the front right camera 44c will be partly out of the image, i.e. that a transition should be made from the second state to the first state (step S64: YES), and the process proceeds to step S67. At step S67, the traffic signal recognizing section 78 performs a switch to make the front camera 44a, which is the other camera that captured the traffic signal 106, the camera in charge of recognition. In other words, while the host vehicle 12 is turning left (during the turning operation), the vehicle control apparatus 10 transitions from the second state to the first state and changes the camera in charge of recognition from the front right camera 44c to the front camera 44a, thereby making it possible to use the information of the traffic signal 104 that is possibly out of the image and avoid a decrease in the accuracy of the recognition process performed by the traffic signal recognizing section 78. After the transition from the second state to the first state and the switching of the camera in charge of recognition in this manner (after the change), the process proceeds to step S65. In FIG. 12, the switching of the camera in charge of recognition from the front right camera 44c to the front camera 44a is shown by a dashed-line arrow.

At step S65, the traffic signal recognizing section 78 receives the switching process result of step S67 and recognizes, as the recognition target traffic signal, the traffic signal 106 appearing in the image (image on the left side in FIG. 12) captured by the front camera 44a that is the camera in charge of recognition after the switch. When the process of step S6 ends due to the completion of the process of step S65, the process proceeds to step S8 of FIG. 3.

For step S8 and onward, at the host vehicle position P5 as well, in the same manner as for the cases of the host vehicle positions P3 and P4, steps S8 to S12 are performed. When the host vehicle 12 has moved from the host vehicle position P5 and left the intersection 90 (step S13: YES), the process of FIGS. 3 to 5 is finished.

<2.3. Summary of the Operations of FIGS. 3 to 5>

In this way, the plurality of traffic signals 102 to 106 are installed in order along the left-turn direction of the host vehicle 12 around the intersection 90. Therefore, in the operations of FIGS. 3 to 5, when the host vehicle 12 turns left in the intersection 90, the vehicle control apparatus 10 transitions from the first state to the second state while the host vehicle 12 is turning left (during the turning operation) and thereafter transitions from the second state to the first state, thereby smoothly performing travel control of the host vehicle 12. Specifically, when the transition from the first state to the second state is made, the traffic signal recognizing section 78 switches the camera in charge of recognition (front camera 44a→front right camera 44c) to be a camera facing the right, which is the direction opposite the left turn direction, as shown in FIG. 10, and then when the transition from the second state to the first state is made, the traffic signal recognizing section 78 switches the camera in charge of recognition (front right camera 44c→front camera 44a) to be a camera facing the left turn direction, as shown in FIG. 12. Furthermore, while the host vehicle 12 is turning left (during the turning operation), when a transition between the first state and the second state is made, the traffic signal recognizing section 78 preferentially selects a camera that captures a traffic signal present in the left-turn direction, as the camera in charge of recognition, whereby the traffic signal recognizing section 78 preferentially recognizes the traffic signal that is in the left-turn direction and has been captured by the camera in charge of recognition, as the recognition target traffic signal.

<2.4. Modifications>

The above describes a case in which the host vehicle 12 travelling on the right side of the road turns left at the intersection 90 using the front camera 44a and the front right camera 44c. However, the operations of FIGS. 3 to 5 can also be applied to a case where the host vehicle 12 travelling on the right side of the road turns left at the intersection 90 using the front camera 44g and the front right camera 44c, by using the front camera 44g instead of the front camera 44a.

Furthermore, the operations of FIGS. 3 to 5 can be applied to a case where the host vehicle 12 travelling on the left side of the road turns right at the intersection 90. In this case, the images of the traffic signals may be captured by the front camera 44a or the front camera 44g and the front left camera 44b, which is arranged on the opposite side (left side of the host vehicle 12) of the turning direction (right-turn direction) of the host vehicle 12 at the intersection 90, and the traffic signals in the captured images may be recognized.

Furthermore, if the host vehicle 12 travelling on the right side of the road makes a left turn at the intersection 90, it is possible for the camera in charge of recognition to be switched in the order of front camera 44a→front right camera 44c→rear right camera 44e, and thereafter switched in the order of rear right camera 44e→front right camera 44c→front camera 44a. On the other hand, if the host vehicle 12 travelling on the left side of the road turns right at the intersection 90, it is possible for the camera in charge of recognition to be switched in the order of front camera 44a→front left camera 44b→rear left camera 44d, and thereafter switched in the order of rear left camera 44d→front left camera 44b→front camera 44a.

Furthermore, at step S62 of FIG. 4, if no traffic signals appear in the image captured by the camera in charge of recognition (step S62: NO), the process may proceed to step S67 and the camera in charge of recognition may be switched to another camera that captures an image of a traffic signal.

As shown by the dashed line in FIG. 4, if only one traffic signal (recognition target traffic signal) is captured by the camera in charge of recognition, the process of step S65 may be skipped.

At step S71 of FIG. 5, if no traffic signals appear in the image captured by the camera in charge of recognition (step S71: NO), the process may proceed to step S75 and the camera in charge of recognition may be switched to another camera that captures an image of a traffic signal.

At step S72 of FIG. 5, if one traffic signal (recognition target traffic signal) appears in the image captured by the camera in charge of recognition and no traffic signals appear in the image captured by the other camera (step S72: NO), the process may proceed to step S74 and the recognition target traffic signal that appears in the image captured by the camera in charge of recognition may be recognized.

The above describes a case in which, mainly, when there is a possibility that a traffic signal 102, 104, or 106 will be partly out of the image, the traffic signal recognizing section 78 switches the camera in charge of recognition from the front camera 44a to the front right camera 44c or from the front right camera 44c to the front camera 44a. However, the traffic signal recognizing section 78 is not limited to using such an ON/OFF switching technique, and may be able to change the camera in charge of recognition using a variety of techniques. For example, in a case where the same traffic signal 102, 104, or 106 appears in images captured respectively by the front camera 44a and the front right camera 44c, the traffic signal recognizing section 78 may gradually change the camera in charge of recognition from one camera to the other, according to the recognition rate for the traffic signal 102, 104, or 106. In other words, in a case where the recognition rate for the traffic signal 102, 104, or 106 that is the same in two images changes within a range of 10:0 to 0:10 in accordance with the traveling of the host vehicle 12, the traffic signal recognizing section 78 may gradually change the camera in charge of recognition according to the change of this recognition rate.

The above describes a case in which the operations of FIGS. 3 to 5 are performed by the intersection processing section 66 of the vehicle control apparatus 10. However, the vehicle control apparatus 10 is not limited to the above description, and the control system 16 may have any internal configuration as long as the vehicle control apparatus 10 is capable of performing travel control of the host vehicle 12 by maintaining the first state when the host vehicle 12 is progressing straight, and performing travel control of the host vehicle 12 by transitioning from the first state to the second state while the host vehicle 12 performs the turning operation.

[3. Effects Realized by the Vehicle Control Apparatus 10]

As described above, the vehicle control apparatus 10 is a vehicle control apparatus that automatically performs, at least partially, travel control of the host vehicle 12 based on the images captured by the plurality of cameras 44 (44a to 44g) provided to the host vehicle 12.

In this case, the plurality of cameras 44 includes the front cameras 44a and 44g that capture images of at least the imaging region 86a that is a region in front of the host vehicle 12 and the front left camera 44b, the front right camera 44c, the rear left camera 44d, or the rear right camera 44e that capture images of at least regions to the side (imaging regions 86b and 86c) adjacent to the imaging region 86a.

Furthermore, the vehicle control apparatus 10 is configured to have a first state for performing travel control of the host vehicle 12 based on the traffic signals 102 to 106 (traffic signal information) that appear in the images captured by the front cameras 44a and 44g and a second state for performing travel control of the host vehicle 12 based on the traffic signals 102 to 106 (traffic signal information) that appear in the images captured by the front left camera 44*b*, the front right camera 44*c*, the rear left camera 44*d*, or the rear right camera 44*e*.

With the vehicle control apparatus 10, it is possible to perform travel control of the host vehicle 12 in the first state when the host vehicle 12 is progressing straight, and to transition from the first state to the second state while the host vehicle 12 is turning left or right (during a turning operation).

In this way, by transitioning from the first state to the second state while the host vehicle 12 is performing the turning operation, it is possible to continue capturing images of the traffic signals 102 to 106. Therefore, even when the host vehicle 12 performs the turning operation, it is possible to perform the travel control, including at least acceleration and deceleration control of the host vehicle 12, based on the traffic signals 102 to 106 that appear in the images captured over a long period of time.

Furthermore, since the first state is maintained when the host vehicle 12 is progressing straight (when the host vehicle 12 does not perform the turning operation), it is possible to reduce the causes of erroneous detection (for example, cases where there afternoon sun is in the side regions (imaging regions 86*b* and 86*c*) captured by the front left camera 44*b*, the front right camera 44*c*, the rear left camera 44*d*, and the rear right camera 44*e*) of the traffic signals 102 to 106 such as the display colors of the traffic signals 102 to 106 between front cameras 44*a* and 44*g* and the front left camera 44*b*, front right camera 44*c*, rear left camera 44*d*, or rear right camera 44*e* due to unexpected transitioning from the first state to the second state.

Furthermore, the vehicle control apparatus 10 may transition from the first state to the second state upon having determined that any one of traffic signals 102 to 106 appearing respectively in the images captured by the front cameras 44*a* or 44*g* and the front left camera 44*b*, front right camera 44*c*, rear left camera 44*d*, or rear right camera 44*e* are the same traffic signal 102, 104, or 106, based on the signal periods, display colors, display patterns, installation positions, or surrounding environment of the traffic signals 102 to 106. Therefore, it is possible to reliably continue capturing images of the same traffic signal 102 to 106.

Furthermore, the vehicle control apparatus 10 is capable of transitioning from the first state to the second state when the host vehicle 12 turns left or right at the intersection 90. Therefore, the first state can be maintained when the host vehicle 12 progresses straight through the intersection 90. As a result, it is possible to perform suitable travel control according to the travel operation of the host vehicle 12.

Yet further, the vehicle control apparatus 10 is capable of transitioning from one state to the other when the same traffic signal 102, 104, or 106 appears in an image captured by the front camera 44*a* or 44*g* and an image captured by the front left camera 44*b*, front right camera 44*c*, rear left camera 44*d*, or rear right camera 44*e*, among which the imaging regions 86*a* to 86*c* partially overlap. Therefore, it is possible to avoid a situation where the traffic signals 102 to 106 are partly out of the image.

The vehicle control apparatus 10 is capable of, while the host vehicle 12 is performing the turning operation, at least transitioning from the first state to the second state in which travel control of the host vehicle 12 is performed based on the traffic signals 102 to 106 appearing in the images captured by the front left camera 44*b*, the front right camera 44*c*, the rear left camera 44*e*, or the rear right camera 44*e* arranged on an outer side relative to the turning direction of the host vehicle 12. Therefore, it is possible to continue the image capturing without the traffic signals 102 to 106 being partly out of the image.

Furthermore, in a case where the plurality of traffic signals 102 to 106 are arranged in the stated order along the turning direction, the vehicle control apparatus 10 may transition from the first state to the second state while the host vehicle 12 performs the turning operation, and thereafter transition from the second state to the first state. In this way, it is possible to smoothly perform travel control while sequentially capturing images of the plurality of traffic signals 102 to 106.

Yet further, in a case where the plurality of traffic signals 102 to 106 are installed, the vehicle control apparatus 10 may cause the front left camera 44*b*, the front right camera 44*c*, the rear left camera 44*d*, or the rear left camera 44*d* to prioritize image capturing of the traffic signals 102 to 106 located in the turning direction, by transitioning from the first state to the second state while the host vehicle 12 performs the turning operation. Therefore, it is possible to efficiently and smoothly perform the travel control and the image capturing of the traffic signals 102 to 106.

The technical scope of the invention is not limited to the above described embodiments, and it is apparent that various alterations can be made without deviating from the scope of the present invention. Alternatively, various configuration may be arbitrarily combined, as long as the

What is claimed is:

1. A vehicle control apparatus that automatically performs, at least partially, travel control of a host vehicle, based on images captured by a plurality of cameras provided to the host vehicle, wherein the plurality of cameras are formed from a first camera that captures an image of at least a front region in front of the host vehicle and a second camera that captures an image of at least a side region adjacent to the front region, the vehicle control apparatus is configured to have a first state for performing the travel control based on traffic signal information of the image captured by the first camera and a second state for performing the travel control based on traffic signal information of the image captured by the second camera, and the vehicle control apparatus performs the travel control in the first state when the host vehicle progresses straight through an intersection, and transitions from the first state to the second state after judging that the traffic signal in the images captured by the first camera and the second camera is the same traffic signal, based on a signal period, display color, display pattern, installation position, or surrounding environment of the traffic signal when the host vehicle having travelled straight starts to perform a turning operation at another intersection.

2. The vehicle control apparatus according to claim 1, wherein the vehicle control apparatus is capable of transitioning from one state to the other state when the same traffic signal information appears in the images captured by the first camera and the second camera, whose imaging regions partially overlap.

3. The vehicle control apparatus according to claim 1, wherein the vehicle control apparatus is capable of, while the host vehicle performs the turning operation, at least transitioning from the first state to the second state in which the travel control is performed based on the traffic signal information of the image captured by the second camera arranged on an outer side of the host vehicle relative to the turning direction of the host vehicle.

4. The vehicle control apparatus according to claim 3, wherein in accordance with a plurality of traffic signals installed sequentially along the turning direction, the vehicle control apparatus transitions from the first state to the second state while the host vehicle performs the turning operation, and thereafter transitions from the second state to the first state.

\* \* \* \* \*

UNITED STATES PATENT AND TRADEMARK OFFICE
CERTIFICATE OF CORRECTION

| | | |
|---|---|---|
| PATENT NO. | : 11,073,833 B2 | Page 1 of 1 |
| APPLICATION NO. | : 16/365246 | |
| DATED | : July 27, 2021 | |
| INVENTOR(S) | : Hiroshi Miura and Marina Saikyo | |

It is certified that error appears in the above-identified patent and that said Letters Patent is hereby corrected as shown below:

In the Specification

Column 22:
Line 27, insert --combination does not cause a technical contradiction.-- after "as long as the"

Signed and Sealed this
Ninth Day of November, 2021

Drew Hirshfeld
*Performing the Functions and Duties of the
Under Secretary of Commerce for Intellectual Property and
Director of the United States Patent and Trademark Office*